(12) United States Patent
Clauss

(10) Patent No.: US 6,430,909 B1
(45) Date of Patent: Aug. 13, 2002

(54) GRINDING ARRANGEMENT

(75) Inventor: Steffen Clauss, Dellfeld (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/483,010

(22) Filed: Jan. 13, 2000

(30) Foreign Application Priority Data

Mar. 11, 1999 (DE) ......................... 199 10 758

(51) Int. Cl.⁷ ............................................. A01D 75/08
(52) U.S. Cl. ............................................. 56/250; 56/1
(58) Field of Search .................... 56/250, 1; 451/21; 116/280; 340/598, 590, 442, 454; 73/146; 200/DIG. 35, 86 R, 86 A

(56) References Cited

U.S. PATENT DOCUMENTS

| | | | |
|---|---|---|---|
| 3,490,179 A | | 1/1970 | Militzer et al. |
| 3,805,228 A | * | 4/1974 | Peeples ...................... 340/454 |
| 3,869,695 A | * | 3/1975 | Kita ............................ 340/454 |
| 3,908,315 A | * | 9/1975 | Schaller ..................... 451/242 |
| 3,964,211 A | | 6/1976 | Engle |
| 4,184,145 A | * | 1/1980 | Fima .......................... 340/454 |
| 4,532,499 A | * | 7/1985 | Collin et al. ................ 340/644 |
| 4,991,476 A | | 2/1991 | Chow et al. |
| 5,743,073 A | * | 4/1998 | Paquet ....................... 56/12.1 |

FOREIGN PATENT DOCUMENTS

| | | |
|---|---|---|
| DE | 35 35 473 | 4/1987 |
| EP | 0 302 565 | 2/1989 |

OTHER PUBLICATIONS

Abstract from GB 2172945A.*
Abstract from DE 3535473A.*
Abstract from DE 3535473A1.*

* cited by examiner

Primary Examiner—Thomas B. Will
Assistant Examiner—Meredith C. Petravick

(57) ABSTRACT

A forage harvester includes a cutting drum equipped with a plurality of cutting knives. A grinding arrangement is provided for sharpening the knives. Different embodiments of a wear sensing device are provided which include sensing circuit elements that are either embedded in the sharpening stone or carried by the backing plate of the sharpening stone assembly. In either case, the sensing circuit elements are located so as to make or break a circuit when a predetermined amount of the sharpening stone has worn away.

1 Claim, 4 Drawing Sheets

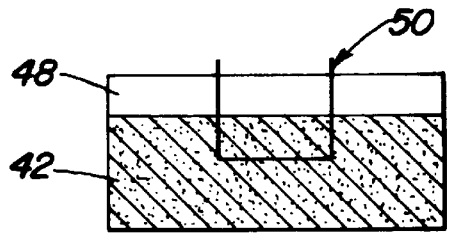
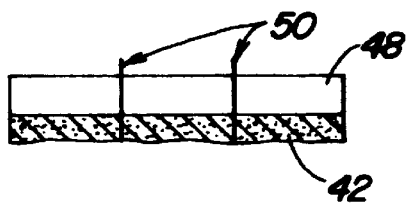
FIG. 3    FIG. 4
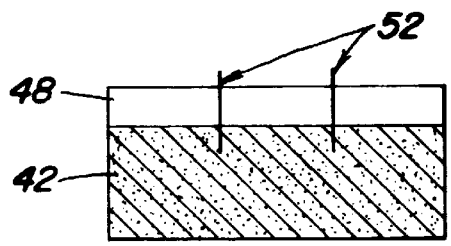
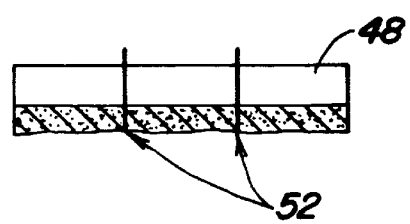
FIG. 5    FIG. 6
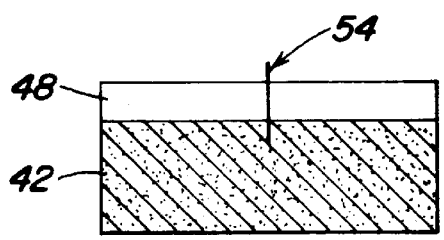
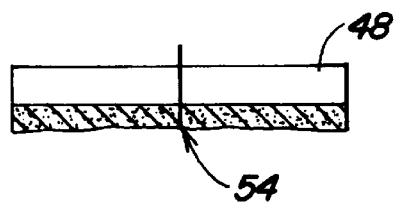
FIG. 7    FIG. 8
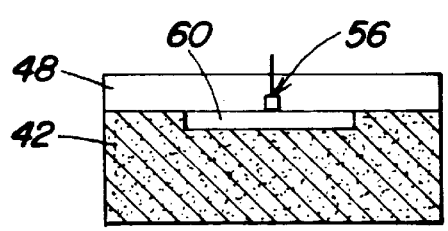
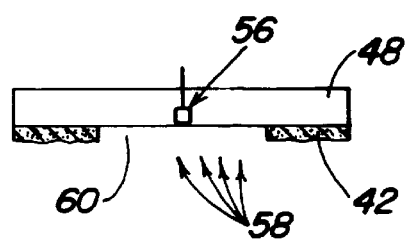
FIG. 9    FIG. 10

GRINDING ARRANGEMENT

BACKGROUND OF THE INVENTION

The invention concerns a grinding arrangement with a grinding stone for the grinding of a knife.

On harvesting machines and harvest preparation machines such as, for example, a forage harvester, knives are employed for chopping of plant material and other materials. These knives become dull when so employed and must be ground. In the state of the art, various manual and automatic grinding mechanisms are known.

In the known grinding mechanisms, grinding stones of the most diverse shapes and materials are employed. As a rule, the grinding stone is fastened to a grinding stone retainer and is moved over the width of the knives during the grinding process and successively fed towards the knives. In addition to the knives that are being sharpened, the grinding stone also wears during the grinding process. It is therefore possible for the grinding stone retainer to come into contact with the knives that are to be sharpened when the grinding stone is completely worn and thereby damages the knives.

The problem underlying the invention is seen in the aforementioned disadvantages in the state of the art.

SUMMARY OF THE INVENTION

According to the invention, there is provided a novel way of preventing damage to the cutting knives of a forage harvester coming into contact with a grinding stone retainer, during the sharpening process, after the grinding stone is worn away.

A broad object of the invention is to preventing possible damage to the knives by the grinding arrangement by constructing a grinding stone such that its worn condition can be easily detected so that a worn stone can be replaced promptly by a new one.

A more specific object of the invention is to provide a knife grinding stone and detection arrangement constructed for use with each other so that an electrical signal is transmitted when the wear limit of the grinding stone is reached, the signal being used for the control of an indicator arrangement that informs the user of the need to replace the grinding stone.

A alternative or additional object of the invention is to provide knife grinding stone and detection arrangement wherein the detection arrangement may also control the grinding arrangement in such a way that grinding is possible only with a grinding stone that has not yet reached its wear limit.

Yet another object of the invention is to provide a further alternate construction wherein the indicator arrangement is loaded with another message that warns the user shortly before reaching the wear limit that the grinding stone must soon be replaced, this being performed by a detection arrangement that senses a second wear condition of the grinding stone, that lies just ahead of the wear limit.

Another more specific object of the invention is to provide a grinding stone arrangement including a conductive element embedded into the grinding stone that is, in one case, destroyed upon reaching the wear limit, and in another case, becomes exposed, with the detection arrangement being constructed in accordance with the particular case to sense the condition of this element. The detection arrangement may include a microprocessor that forms a component of the control arrangement of the grinding and/or cutting arrangement.

A further alternative or additional object of the invention is to provide an optical sensor whose output signal changes as soon as the wear limit of the grinding stone is reached. For this purpose, for example, an optical sensor is located at a cavity provided in the grinding stone into which ambient light falls upon reaching the wear limit, this light being sensed by the optical sensor.

These and other objects of the invention will become apparent from a reading of the ensuing description together with the appended drawings.

BRIEF DESCRIPTION OF THE DRAWINGS

FIG. 3 shows an unused grinding stone according to a first embodiment of the invention.

FIG. 4 shows the grinding stone of FIG. 3 worn to its wear limit.

FIG. 5 shows an unused grinding stone according to a second embodiment of the invention.

FIG. 6 shows the grinding stone of FIG. 5 worn to its wear limit.

FIG. 7 shows an unused grinding stone according to a third embodiment of the invention.

FIG. 8 shows the grinding stone of FIG. 7 worn to its wear limit.

FIG. 9 shows an unused grinding stone according to a fourth embodiment of the invention.

FIG. 10 shows the grinding stone of FIG. 9 worn to its wear limit.

DESCRIPTION OF THE PREFERRED EMBODIMENT

Figure 1:
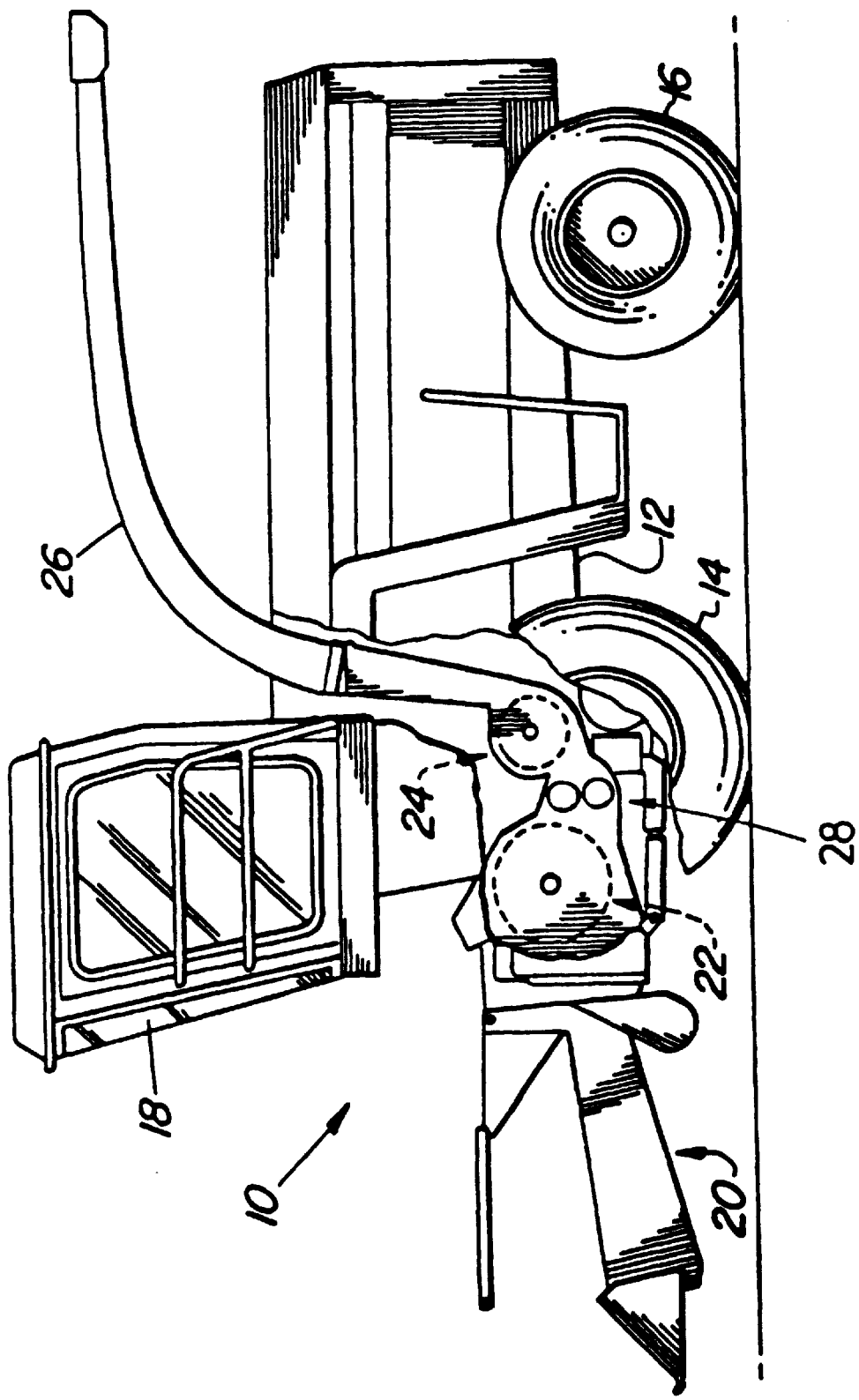
FIG. 1 is a schematic right side elevational view of a harvesting machine including a chopper drum with which a grinding arrangement constructed in accordance with the present invention is particularly suited for use.

Referring now to FIG. 1, there is shown a harvesting machine 10 in the form of a self-propelled forage harvester supported on a frame 12 that is carried on front and rear wheels 14 and 16. The operation of the harvesting machine 10 is controlled from an operator's cab 18 from which a crop recovery or pickup arrangement 20 can be controlled visually. Crop taken up from the ground by means of the crop recovery arrangement 20, for example, corn, grass or the like is conducted to a chopper drum 22 which chops it into small pieces and delivers it to a conveyor arrangement 24. The crop leaves the harvesting machine 10 to an accompanying trailer (not shown) through a pivoted discharge pipe 26. A post-chopper reducing arrangement 28 extends between the chopper drum 22 and the conveyor arrangement 24 by means of which the crop conveyed is delivered tangentially to the conveyor arrangement 24. Further details of the harvesting machine 10 do not require description since these are known in themselves. However, the position of the post-chopper reducing arrangement 28 is not critical, so that it can also be provided downstream of the conveyor arrangement 24.

Figure 2:
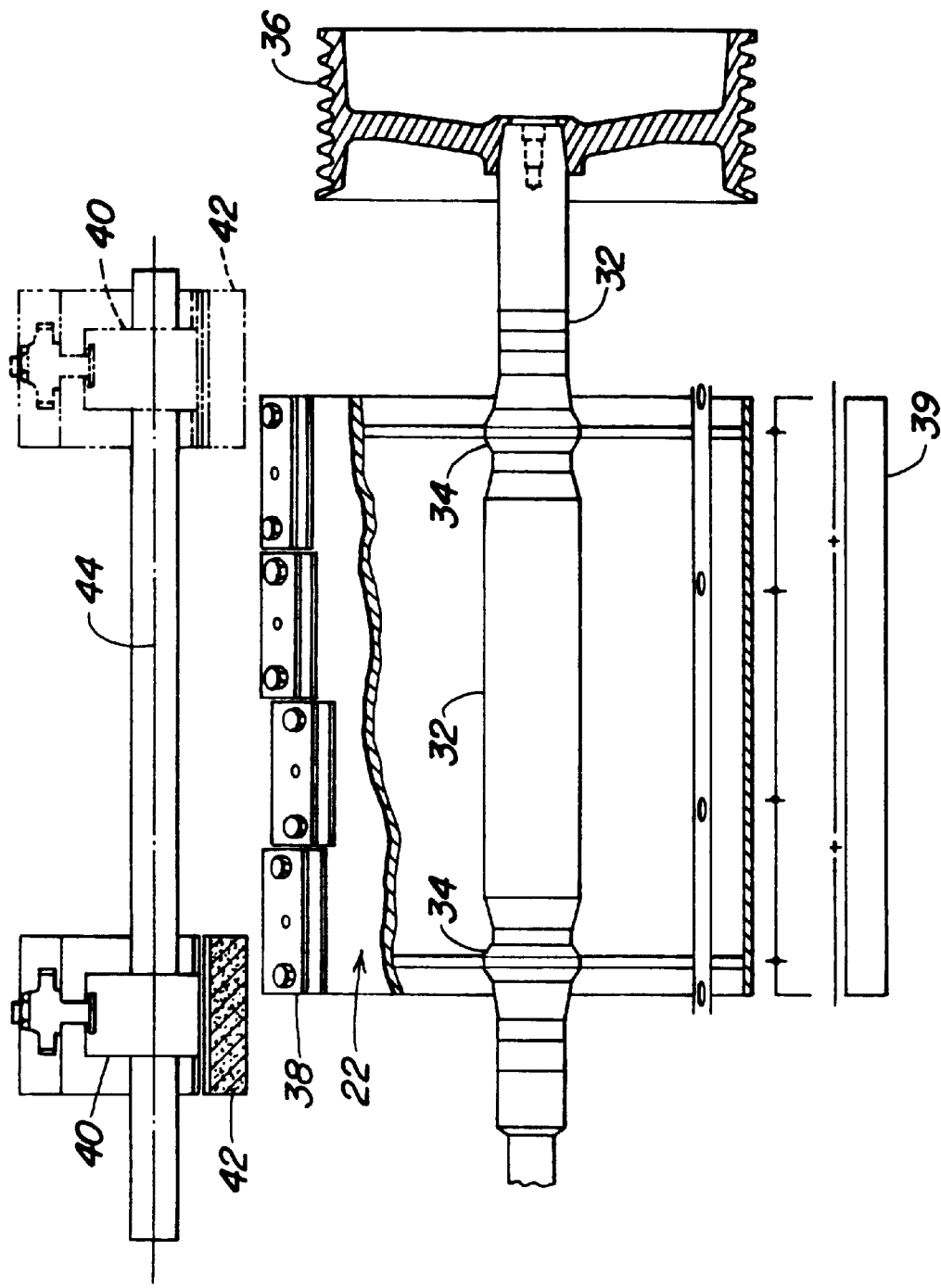
FIG. 2 is a front elevational view of a chopper drum with parts in section shown together with a grinding arrangement including a grinding stone shown in end positions assumed during the grinding operation.

FIG. 2 is a schematic view of a chopper drum 22 and a grinding arrangement associated with it, as it is seen from the view of the harvesting machine 10 in FIG. 1 (with respect to the direction of operation) from the front. The chopper drum 22 comprises a central shaft 32 supported on two bearings 34 arranged at opposite ends of the chopper drum and carried by the frame 12 of the harvesting machine 10 in a well known manner, not shown. The chopper drum 22 can be brought into rotation by a belt drive including a pulley 36 fixed to an end of the shaft 32 and to which power is delivered by belts extending from a drive pulley, not shown, that is driven from a motor of the harvesting machine 10. The chopper drum 22 is provided with a number of knives 38 distributed over its width and circumference which cut the crop taken up by the crop recovery arrangement 20 in interaction with a fixed shear bar 39. Critical to the proper cutting of the crop is the spacing of the knives 38 from the shear bar 39 and the sharpness of the knives 38. If the distance to the shear bar 39 is too small, the knives 38 rapidly become dull or even damaged. If the spacing is too large, the harvested crop is not cut properly. The present invention refers to the second problem area, the sharpness of the knives 38. In order to be able to sharpen the knives 38 after a certain operating time, without having to disassemble the knives 38 or the entire chopper drum 22, a grinding arrangement is provided above the chopper drum 22, close to the enveloping circle described by the knives 38, that generally comprises a grinding stone retainer 40, an associated grinding stone 40 and a guide rail 44, on which the grinding stone retainer 40 is supported in bearings so that it can move axially.

When the knives 38 are to be sharpened, the chopper drum 22 is set into rotation, as a rule in the opposite direction of rotation and/or at reduced rotational speed compared to normal chopper operation. The grinding stone retainer 40, with the grinding stone 42 fastened to it, is moved from a rest or park position, not shown, in which it is located to the side next to the chopper drum 22, over the entire width of the chopper drum 22. Here the underside of the grinding stone 42 is in contact with, and sharpens, the knives 38. The grinding process is performed in such a way that the grinding stone 42 is moved several times back and forth over the width of the chopper drum 22. The end points of this movement are illustrated in FIG. 2, with the grinding stone retainer 40 and associated grinding stone 42 being shown in solid lines at the left reversal point and being shown in dashed linse at the right reversal point. Between the movements, the grinding stone 42 is fed, that is, it is given a minute advance of the grinding stone 42 towards the knives 38. The feed motion in itself is known and either can be performed by movement of the grinding stone or the entire retainer arrangement.

In order to prevent the knives 38 from coming into contact with the grinding stone retainer 40 when the grinding stone 42 is worn to its wear limit, sensors are applied according to the invention that detect this wear limit. FIG. 3 shows an unused or factory fresh, grinding stone 42, in which is embedded an electrical conductor, here shown as a u-shaped wire loop 50. The wire loop 50 can be embedded during the manufacture of the grinding stone 42 that is performed, for example, by sintering or compacting of abrasive grinding material and an adhesive filler. A plate 48 of the grinding stone retainer 40, to which the grinding stone 42 is fastened, as a rule by an adhesive connection, is a non-conductor at least in the region through which the ends of the wire loop 50 are routed. In this region, the plate 48 may be provided with a sufficiently large hole or it may be an electrical insulator entirely. The plate 48 is preferably fastened so that it can be removed from the usual grinding stone retainer 40, shown in FIG. 2, in order to permit replacement of both components, grinding stone 42 and plate 48, if required. For this purpose, a screw connection is particularly appropriate.

In FIG. 3, the grinding stone 42 is new and the wire loop 50 is intact, hence, an electrical current may flow between its ends. FIG. 4 illustrates the same grinding stone 42 which has been worn to its predetermined wear limit. Along with the abrasive material, the central portion of the wire loop 50 has also been ground away and there is no electrical connection between the opposite ends. By measurement of the conductivity, or resistance, of the wire loop 50, the attainment of the wear limit of the grinding stone 42 can be indicated.

FIG. 5 shows a second embodiment of a grinding stone 42 according to the invention. Two wires 52 are integrated into the grinding stone 42 as electrically conducting elements, which extend in the direction in which the grinding stone 42 is fed towards the knives 38. When the grinding stone 42 is worn, as is shown in FIG. 6, the ends of the wires 52 facing the knives 38 become exposed. These exposed ends can come into contact with the knives 38, or another conductor forming part of a detector circuit which measures the resistance or the conductivity between the wires 52 and in that way senses when the wear limit of the grinding stone 42 has been occurred.

FIG. 7 shows a third embodiment of a grinding stone according to the invention. In this embodiment, only a single wire 54 is integrated into the grinding stone 42 as an electrically conducting element. When the grinding stone 42 has reached its wear limit, as is illustrated in FIG. 8, the end of the wire 54 facing the knives 38, shown at the bottom in the drawing, becomes exposed and can come into contact with the knives 38 when the knife drum rotates. By measuring the resistance between the chopper drum 22, which as a rule lies at the level of a mass potential, and the upper end of the wire 54, the wear limit of the grinding stone can be detected; in this case, the resistance becomes significantly less than before at certain angular positions of the chopper drum 22 at which the wire 54 makes contact with a knife 38. It is also possible to move the grinding stone retainer 40 to a position alongside the chopper drum 22 and to bring the under side of the grinding stone 42 into contact with another conducting test element and to measure the corresponding resistance.

FIG. 9 shows a grinding stone according to a fourth embodiment of the invention. On the upper side of the grinding stone 42 facing away from the knives 38, a cavity 60 is provided in which an optical sensor 56 is arranged. When the grinding stone 42 has reached its wear limit, as shown in FIG. 10, the material covering the cavity 60 in the grinding stone 42 will have been ground away, so that the cavity 60, and therewith the optical sensor 56, is exposed to incoming light 58. In this way, the wear limit can be detected without any problem.

Figure 11:
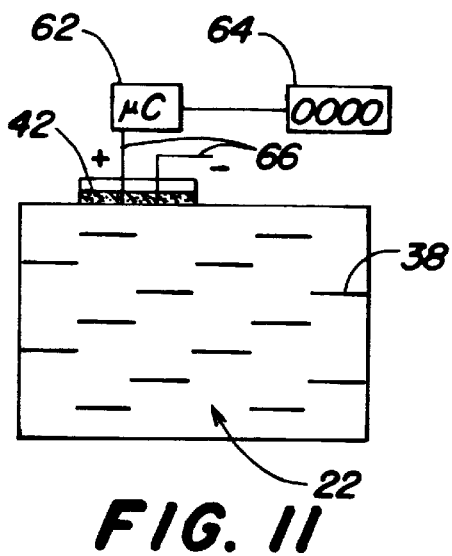
FIG. 11 shows a grinding stone connected to a detector circuit.

FIG. 11 shows a first embodiment of a detector circuit that can be applied in connection with grinding stones 42 constructed in accordance with FIGS. 3 through 6. The grinding stone retainer 40 with the attached grinding stone 42 is provided with a pair of flexible cables 66, first ends of which are respectively connected to the wires 50 or 52, which are integrated into the grinding stone 42. One of the cables 66 is connected with its other end to a certain potential (in the drawing, the vehicle mass), and the other cable is connected to a microprocessor 62, which for its part controls an indicator arrangement 64. The microprocessor 62 is stationary, that is, it is not moved over the width of the chopper drum 22.

In place of the microprocessor 62, a relay or the like could also be applied. On the basis of the potential at the cable 66, the microprocessor 62 is provided with information that indicates whether the grinding stone 42 has reached its wear limit (then the cable lies at 0 V potential) or not (then the cable lies at any other potential). In this embodiment, the grinding stone 42 is monitored continuously. In a grinding stone 42 as shown in FIG. 3, the resistance increases when the grinding stone is worn by interruption of the wire loop 50. On the other hand, the resistance decreases in the case of a grinding stone 42 shown in FIG. 5 when the wear limit is reached since then the knives 38 generate a contact between the wires 52, at corresponding angular positions, while previously the resistance was higher.

Figure 12:
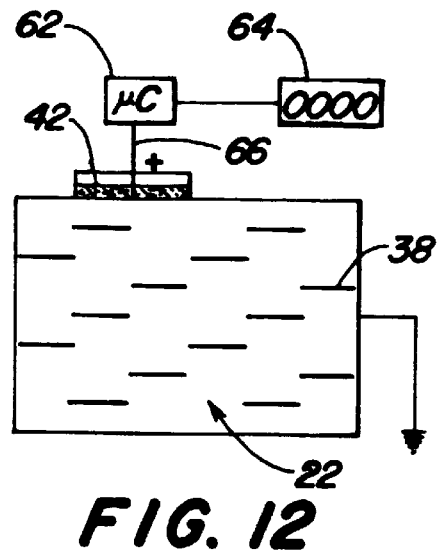
FIG. 12 shows a grinding stone connected to a different detector circuit.

FIG. 12 shows a second embodiment of a detector circuit that can be applied together with the grinding stone 42 shown in FIGS. 7 and 8. The wire 54 integrated into the grinding stone 42 is connected over a flexible cable 66 to a stationary microprocessor 62, which controls the indicator arrangement 64. If the grinding stone 42 has reached its wear limit, a circuit is intermittently completed between the wire 54, and hence between the cable 66, and the mass of the vehicle when respective ones of the knives 38 are positioned in engagement with the stone 42, and hence with the exposed wire 54. The microprocessor 62 could be replaced by a simpler device, such as a relay or toggle switch. Both devices are constructed such that they respond to the contact of a given knife 38 with the wire 54 and energize the indicator arrangement 64. In this embodiment, the sensing of the condition of the grinding stone 42 is also continuous.

Figure 13:
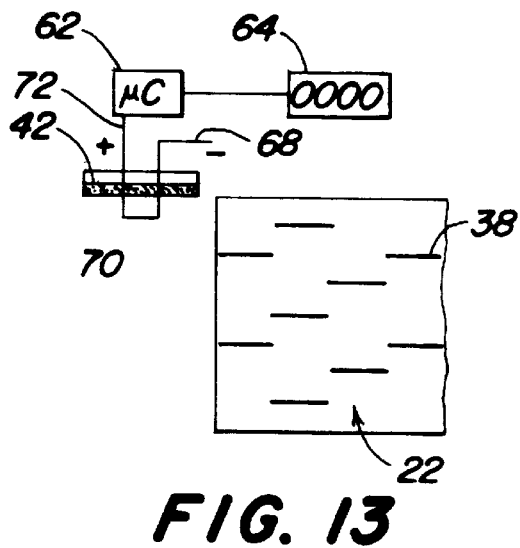
FIG. 13 shows a grinding stone in a park position connected to a test element forming part of a third detector circuit embodiment.

FIG. 13 shows a third embodiment of a detector circuit that can be used with the grinding stones of FIGS. 3 and 5. For use with this detector circuit, the grinding stone 42 is moved to a position alongside the chopper drum 22, for example, after completion of a grinding process. If the grinding stone 42 has not been worn to its wear limit, neither the loop 50 or the wires 52 will come into contact with a test element in the form of a wire loop 70. The upper end of one of the two ends of the wire loop 50 or of the wires 52 is connected over a cable 68 to a certain potential and the upper end of the other of the two ends of the wire loop 50 or of the wires 52 is connected over a further cable 72 to the microprocessor 62 which controls the indicator arrangement 64. The wire loop 70 and the cables 68 and 72 are stationary. When the grinding stone 42 has reached its wear limit, the wire loop 70 comes into contact, in the one case, with the wires left after the central part of the loop 50 has been worn away, and in the other case with the lower ends of the exposed wires 52 in the grinding stone 42, so that the potential at the input of the microprocessor 62 changes. If the grinding stone 42 is worn only little, no contact is made between the wire loop 70 and the loop 50 or the wires 52 in the grinding stone 42.

Figure 14:
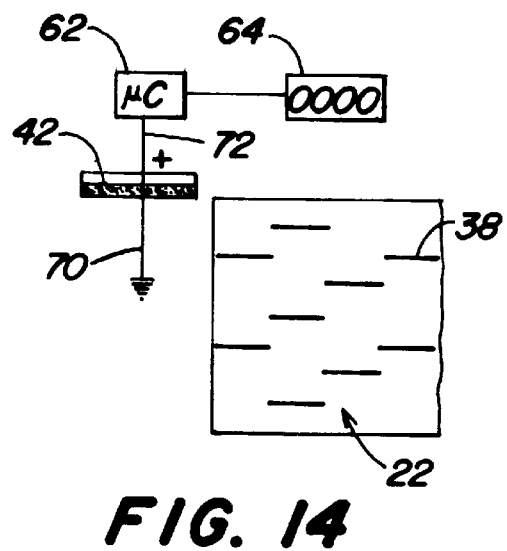
FIG. 14 is a view like FIG. 13 but showing a different test element and detector circuit for detecting the wear of a grinding stone of a construction like that shown in FIGS. 7 and 8.

Finally, in FIG. 14, a fourth embodiment of a detector circuit is illustrated that can be applied in connection with the grinding stone 42 shown in FIGS. 7 and 8. The contacts of the detector circuit are also arranged stationary alongside the chopper drum 22. To test the grinding stone 42 after a grinding process, it must therefore be moved to a position alongside the chopper drum 22. A conductor 70', used as a test element, is connected to mass potential and a cable 72 is connected to the microprocessor 62 which controls the indicator arrangement 64. When the grinding stone 42 is positioned above a contact forming an end of the conductor 70', the cable 72 is attached to the top end of the conductor 54. If the grinding stone 42 has not reached its wear limit, no electrical path is made between the wire 54, in the grinding stone 42, and the conductor 70'. If, on the other hand, the grinding stone 42 has reached its wear limit, then the electrical conductor 70', which is at mass potential, comes into electrical connection with the wire 54, so that the cable 72 is also at mass potential, and the microprocessor 62 is supplied with a corresponding signal. The microprocessor 62 then controls the indicator unit 64 and warns the user that the grinding stone 42 has reached its wear limit.

As a result, the wires 50, 52, 54 embedded in the grinding stone 42 together with the cables or contacts 66, 68, 70, 70', 72, the microprocessor 62 and the indicator unit 64 form a detector arrangement with which the attainment of the wear limit of the grinding stone 42 can be detected.

What is claimed is:

1. In combination with a forage harvester cutter drum mounted for rotating about a central axis and having a plurality of cutting knives mounted thereon for moving in a cylindrical path, a knife grinding arrangement including a grinding stone mounted for movement between end positions, respectively alongside opposite ends of said cutter drum, and knife sharpening positions wherein said grinding stone is located for engaging and sharpening the cutting knives, and an electrical wear detection circuit for detecting when the grinding stone becomes worn to a wear limit requiring it to be replaced, the improvement comprising: said detection circuit including a conductor means mounted for movement with said stone and located so as to become operative in response to said grinding stone being worn to said wear limit for changing the state of said detector circuit; said detector circuit including a test element located alongside one end of said drum and including a grounded test conductor located for engagement with said conductor means carried by said grinding stone when the grinding stone is placed in a test position adjacent said one end of said drum and is worn to said wear limit.

* * * * *